(12) United States Patent
Jonsson et al.

(10) Patent No.: US 11,580,775 B2
(45) Date of Patent: Feb. 14, 2023

(54) DIFFERENTIATING BETWEEN LIVE AND SPOOF FINGERS IN FINGERPRINT ANALYSIS BY MACHINE LEARNING

(71) Applicant: Fingerprint Cards AB, Gothenburg (SE)

(72) Inventors: Kenneth Jonsson, Kungalv (SE); Alaa Halawani, Borås (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 133 days.

(21) Appl. No.: 16/755,904

(22) PCT Filed: Oct. 5, 2018

(86) PCT No.: PCT/SE2018/051023
§ 371 (c)(1),
(2) Date: Apr. 14, 2020

(87) PCT Pub. No.: WO2019/078769
PCT Pub. Date: Apr. 25, 2019

(65) Prior Publication Data
US 2021/0209336 A1     Jul. 8, 2021

(30) Foreign Application Priority Data
Oct. 18, 2017   (SE) .................................. 1751291-4

(51) Int. Cl.
*G06K 9/62*       (2022.01)
*G06N 20/10*      (2019.01)
(Continued)

(52) U.S. Cl.
CPC ....... *G06V 40/1388* (2022.01); *G06K 9/6247* (2013.01); *G06K 9/6269* (2013.01);
(Continued)

(58) Field of Classification Search
None
See application file for complete search history.

(56) References Cited

U.S. PATENT DOCUMENTS 7,133,541 B2     11/2006   Haselsteiner et al.
8,787,630 B2 *    7/2014   Rowe ................... G06V 10/143
                                                        382/124
(Continued)

FOREIGN PATENT DOCUMENTS

TW          201327411 A       7/2013
WO            0124700 A1      4/2001
(Continued)

OTHER PUBLICATIONS

WO-2012138004-A1 PE2E EN translation (Year: 2012).*
(Continued)

*Primary Examiner* — Soo Shin
(74) *Attorney, Agent, or Firm* — RMCK Law Group, PLC

(57) ABSTRACT

The present disclosure relates to a method performed in a fingerprint analysis system for facilitating differentiating between a live finger and a spoof finger. The method comprises acquiring a plurality of time-sequences of images, each of the time-sequences showing a respective finger as it engages a detection surface of a fingerprint sensor. Each of the time-sequences comprises at least a first image and a last image showing a fingerprint topography of the finger, wherein the respective fingers of some of the time-sequences are known to be live fingers and the respective fingers of some other of the time-sequences are known to be spoof fingers. The method also comprises training a machine learning algorithm on the plurality of time-sequences to produce a model of the machine learning algorithm for differentiating between a live finger and a spoof finger.

21 Claims, 5 Drawing Sheets

(51) Int. Cl.
| | |
|---|---|
| *G06N 3/08* | (2006.01) |
| *G06V 10/44* | (2022.01) |
| *G06V 10/764* | (2022.01) |
| *G06V 10/774* | (2022.01) |
| *G06V 40/12* | (2022.01) |
| *G06V 40/13* | (2022.01) |
| *G06V 40/40* | (2022.01) |

(52) U.S. Cl.
CPC ............ *G06N 20/10* (2019.01); *G06V 10/44* (2022.01); *G06V 40/45* (2022.01)

(56) References Cited

U.S. PATENT DOCUMENTS

| | | | | |
|---|---|---|---|---|
| 9,491,490 | B1* | 11/2016 | Toth | H04N 19/115 |
| 9,721,137 | B2* | 8/2017 | Benkley | G06V 40/1306 |
| 2003/0035571 | A1 | 2/2003 | Haselsteiner et al. | |
| 2012/0300992 | A1* | 11/2012 | Ivanov | G06T 5/001 382/124 |
| 2013/0058544 | A1 | 3/2013 | Sayac et al. | |
| 2014/0301616 | A1 | 10/2014 | Picard et al. | |
| 2016/0350573 | A1 | 12/2016 | Kitchens et al. | |
| 2017/0132407 | A1* | 5/2017 | Sakumoto | G06K 9/0055 |
| 2017/0142447 | A1* | 5/2017 | Toth | H04N 19/154 |
| 2021/0209336 | A1* | 7/2021 | Jonsson | G06K 9/6247 |

FOREIGN PATENT DOCUMENTS

| | | | | |
|---|---|---|---|---|
| WO | WO-2012138004 | A1* | 10/2012 | G06K 9/00087 |
| WO | 2016037077 | A1 | 3/2016 | |
| WO | 2017192719 | A1 | 11/2017 | |
| WO | WO-2021167513 | A1* | 8/2021 | G06K 19/0718 |

OTHER PUBLICATIONS

Antonelli et al., "Fake Finger Detection by Skin Distortion Analysis," IEEE Transactions on Information Forensics and Security, vol. 1, No. 3, Sep. 2006 (Year: 2006).*

Wang et al., "A DCNN Based Fingerprint Liveness Detection Algorithm with Voting Strategy," CCBR 2015, LNCS 9428, pp. 241-249, Nov. 2015 (Year: 2015).*

Noguiera et al., "Fingerprint Liveness Detection Using Convolutional Neural Networks," IEEE Transactions on Information Forensics and Security, vol. 11, No. 6, Jun. 2016 (Year: 2016).*

Aggarwal, T. et al., "Fake Fingerprint Detection Methods," Semantic Scholar, 2014, downloaded Jun. 16, 2020 from https://www.semanticscholar.org/paper/Fake-Fingerprint-Detection-Methods-TanishaAggarwal-Verma/c4433e64d41019f6c813cd8bb20a6f655819b5c3, 3 pages.

Aggarwal, T. et al., "Spoofing Technique for Fingerprint Biometric System," IJSRD—International Journal for Scientific Research & Development, vol. 2, Issue 3, 2014, pp. 1225-1228.

Antonelli, A. et al., "Fake Finger Detection by Skin Distortion Analysis," IEEE Transactions on Information Forensics and Security, vol. 1, No. 3, Sep. 2006, pp. 360-373.

PCT International Search Report and Written Opinion dated Dec. 10, 2018 for International Application No. PCT/SE2018/051023, 13 pages.

Extended European Search Report dated Nov. 2, 2020 for European Patent Application No. 18869387.3, 7 pages.

* cited by examiner

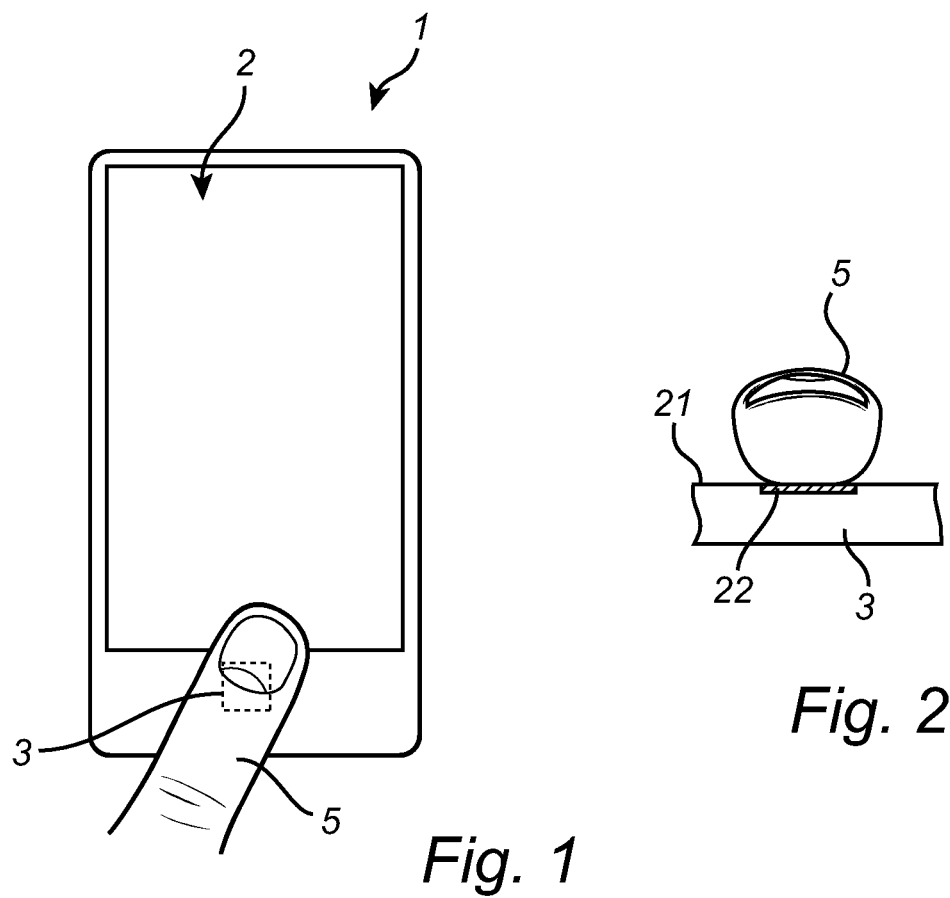
Fig. 1
Fig. 2
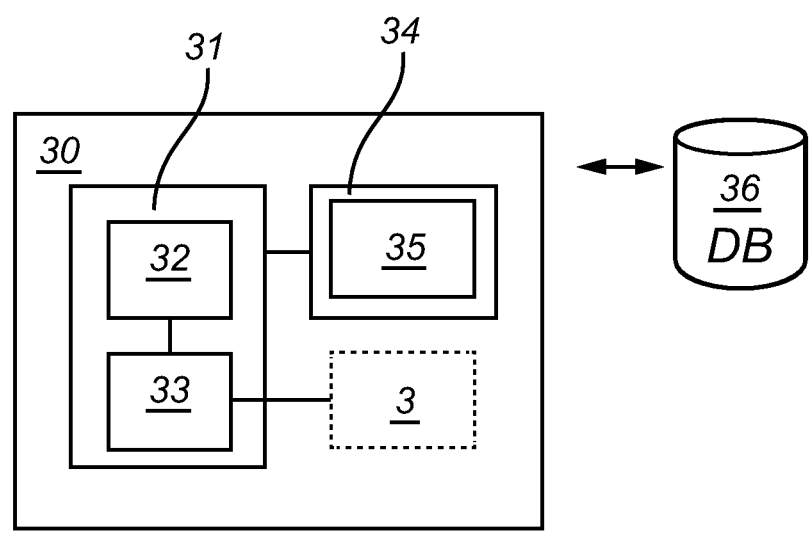
Fig. 3

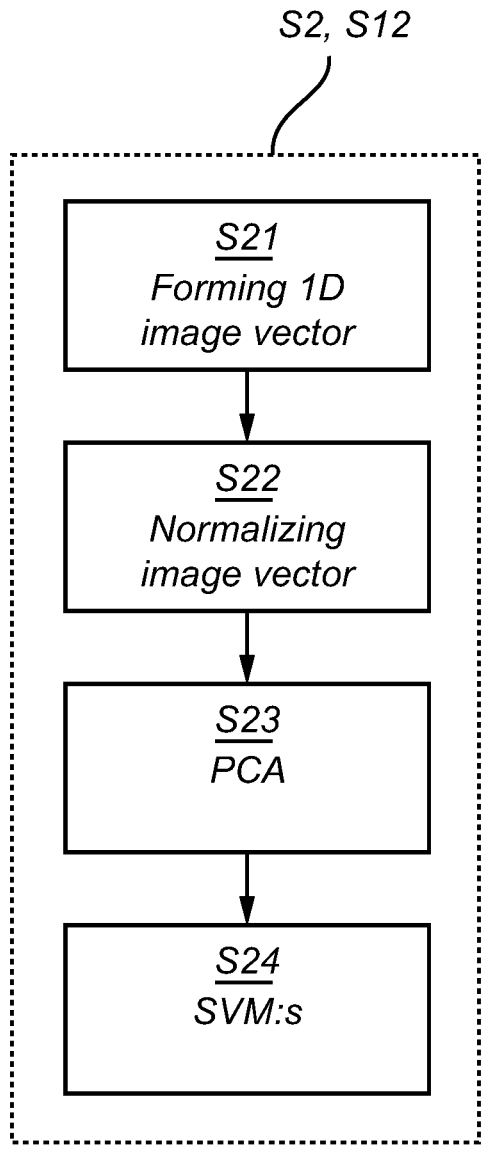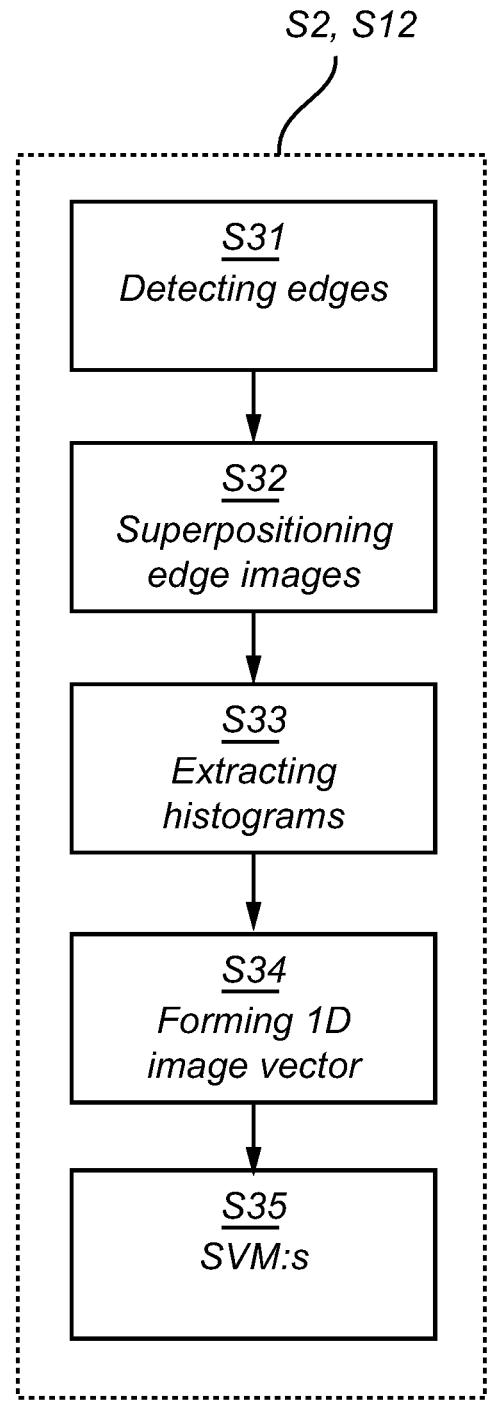
Fig. 9
Fig. 10

DIFFERENTIATING BETWEEN LIVE AND SPOOF FINGERS IN FINGERPRINT ANALYSIS BY MACHINE LEARNING

CROSS-REFERENCE TO RELATED APPLICATIONS

This application is a 371 U.S. National Stage of International Application No. PCT/SE2018/051023, filed Oct. 5, 2018, which claims priority to Swedish Patent Application No. 1751291-4, filed Oct. 18, 2017. The disclosures of each of the above applications are incorporated herein by reference in their entirety.

TECHNICAL FIELD

The present disclosure relates to methods and devices for differentiating between live and spoof fingers by analysis of image time-sequences of fingers engaging a detection surface of a fingerprint sensor.

BACKGROUND

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

Liveness Detection/Anti Spoofing/Presentation Attack Detection is needed to protect biometric systems from attack with spoofed body parts, e.g. a spoof fingerprint.

There are many approaches to solving this problem applied to fingerprint recognition, such as hardware-based methods looking for material properties, pulse detection by oximetry, software-based methods looking for spoof created artefacts in the obtained fingerprint images and looking at fine scale textures.

There are multiple image-based software approaches described that explicitly look at perspiration effects that introduces differences between image frames. But not all fingers exhibit the amount of perspiration needed, especially not in winter conditions. See e.g. IJITKM Special Issue (ICFTEM-2014) May 2014, pp. 61-69 (ISSN 0973-4414), "Fake Fingerprint Detection Methods" by Tanisha Aggarwal et al.

There are also skin elasticity approaches that requires the user to twist the finger while the sensor captures a sequence of images. See e.g. IEEE Transactions on Information Forensics and Security, vol. 1, no. 3, September 2006, "Fake Finger Detection by Skin Distortion Analysis" by Athos Antonelli et al.

U.S. Pat. No. 7,133,541 discloses a method of differentiating between a live finger and an imitated finger. The method comprises obtaining a sequence of images while the finger is being placed on the fingerprint sensor, and variations between the sequential images are analysed to determine whether the finger is live.

Competently made spoofs can reach very high quality with regards to low presence of artefacts.

Since later generations of capacitive sensors are small and, due to a thick coating, have low spatial resolution, the number of artefacts present in each image is low, and fine scale textures are not present. Thus, the available software liveness methods are challenged.

SUMMARY

It is an objective of the present disclosure to provide improved liveness detection for fingerprint sensors, which may be independent of artefact detection or high spatial resolution.

According to an aspect of the present disclosure, there is provided a method performed in a fingerprint analysis system for facilitating differentiating between a live finger and a spoof finger. The method comprises acquiring a plurality of time-sequences of images, each of the time-sequences showing a respective finger as it engages a detection surface of a fingerprint sensor during a time period when the finger is approaching and being pressed against the detection surface. Each of the time-sequences comprises at least a first image and a last image showing a fingerprint topography of the finger, wherein the respective fingers of some of the time-sequences are known to be live fingers and the respective fingers of some other of the time-sequences are known to be spoof fingers. The method also relates to training a machine learning algorithm on the plurality of time-sequences to produce a model of the machine learning algorithm for differentiating between a live finger and a spoof finger.

According to another aspect of the present disclosure, there is provided a method performed in an electronic device comprising a fingerprint sensor of a fingerprint analysis system, for differentiating between a live finger and a spoof finger in association with an authentication operation performed by the electronic device by means of the fingerprint sensor. The method comprises acquiring a time-sequence of images of a finger as it engages a detection surface of the fingerprint sensor during a time period when the finger is approaching and being pressed against the detection surface, wherein the time-sequence comprises at least a first image and a last image of the time-sequence showing a fingerprint topography of the finger. The method also comprises applying a model of a machine learning algorithm to the time-sequence. The method also comprises, based on a result of the applied model, determining whether the finger is a live finger or a spoof finger. The model of a machine learning algorithm may in some embodiments be the model produced by training the machine learning algorithm of the previous method aspect of the invention.

According to another aspect of the present invention, there is provided a computer program product comprising computer-executable components for causing a fingerprint analysis system to perform an embodiment of the method of the present disclosure when the computer-executable components are run on processing circuitry comprised in the fingerprint analysis system.

According to another aspect of the present disclosure, there is provided a fingerprint analysis system comprising processing circuitry, and data storage storing instructions executable by said processing circuitry whereby said fingerprint analysis system is operative to acquire a plurality of time-sequences of images, each of the time-sequences showing a respective finger as it engages a detection surface of a fingerprint sensor during a time period when the finger is approaching and being pressed against the detection surface, each of the time-sequences comprising at least a first image and a last image showing a fingerprint topography of the finger, wherein the respective fingers of some of the time-sequences are known to be live fingers and the respective fingers of some other of the time-sequences are known to be spoof fingers. The fingerprint analysis system is also operative to train a machine learning algorithm with the plurality of time-sequences to produce a model of the machine learning algorithm for differentiating between a live finger and a spoof finger. The fingerprint analysis system may e.g. be comprised in a central server arrangement which also comprises e.g. a database providing the plurality of time-sequences, or be comprised in an electronic device comprising a fingerprint sensor (as in the following aspect), e.g. in the form of a user equipment such as a smartphone or laptop computer.

According to another aspect of the present disclosure, there is provided an electronic device comprising a fingerprint sensor, processing circuitry, and data storage storing instructions executable by said processing circuitry whereby said electronic device is operative to acquire a time-sequence of images of a finger as it engages a detection surface of the fingerprint sensor during a time period when the finger is approaching and being pressed against the detection surface, wherein the time-sequence comprises at least a first image and a last image showing a fingerprint topography of the finger. The electronic device is also operative to apply a model of a machine learning algorithm to the time-sequence. The electronic device is also operative to, based on a result of the applied model, determine whether the finger is a live finger or a spoof finger.

In accordance with the present invention, machine learning is used for differentiating between a live finger and a spoof finger. A machine learning algorithm is trained by means of a plurality of image sequences of different fingers, some of which are known to be live fingers and some of which are known to be spoof fingers. The model thus obtained is used for differentiating between live and spoof fingers by an electronic device comprising a fingerprint sensor, typically in association with, but possibly independent of, an authentication operation performed by the electronic device for authenticating a user of the device.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 1 schematically illustrates an electronic device including a fingerprint sensor, in accordance with an embodiment of the present disclosure.

FIG. 2 schematically illustrates a finger engaging a detection surface of a fingerprint sensor in accordance with an embodiment of the present disclosure.

FIG. 3 is a schematic block diagram of an embodiment of a fingerprint analysis system in optional communication with an external database, in accordance with the present disclosure.

FIG. 9 is a schematic flow chart in more detail of a part of the flow chart of FIG. 7 or FIG. 8.

FIG. 10 is a schematic flow chart in more detail of a part of the flow chart of FIG. 7 or FIG. 8.

DETAILED DESCRIPTION

Figure 4:
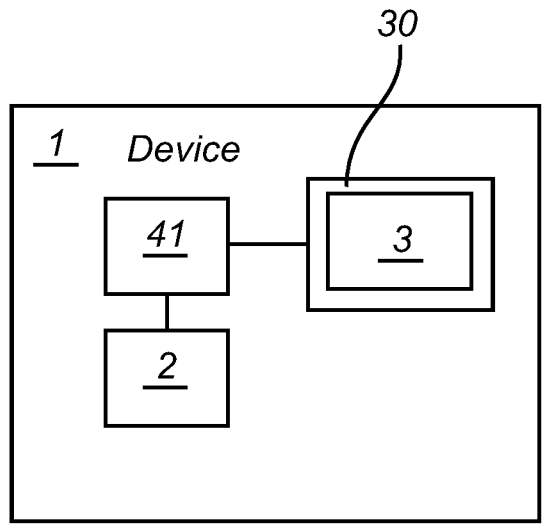
FIG. 4 is a schematic block diagram of an embodiment of an electronic device comprising a fingerprint sensor, in accordance with the present disclosure.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

FIG. 1 shows an electronic device 1, here in the form of mobile phone, e.g. smartphone, comprising a display 2, e.g. comprising touch functionality (i.e. a touch display) and a fingerprint sensor 3. The fingerprint sensor 3 comprises fingerprint sensor circuitry, e.g. for outputting a grey-scale image or the like where different intensities in the image indicate the contact between a detection surface of the fingerprint sensor 3 and a finger 5 placed there on, e.g. as part of fingerprint authentication or navigation using the fingerprint sensor.

The fingerprint sensor 3 may operate according to any sensing technology. For instance, the fingerprint sensor may be a capacitive, optical or ultrasonic sensor. Herein, a capacitive fingerprint sensor, which may be preferred for some applications, is discussed as an example. The fingerprint sensor may comprise a two-dimensional array of fingerprint sensing elements, each corresponding to a pixel of the image outputted by the fingerprint sensor, the pixel e.g. being represented by a grey-scale value. The fingerprint sensor may be located at a side of the display 2, outside of the display area of the display, as shown in FIG. 1, or it may be located within said display area. The outputted image may for instance be in the form of a two-dimensional or one-dimensional pixel array, e.g. of grey-scale values. Each image pixel may provide an image intensity, be it of a grey-scale value or other value. For example, for a capacitive fingerprint sensor, a high pixel intensity (e.g. white in grey-scale) implies low capacitive coupling and thus a large sensed distance between the detection surface and the fingerprint topography. A high pixel intensity may result because the finger does not cover the part of the detection surface where the sensing element corresponding to the pixel is located. Conversely, a low pixel intensity (e.g. black in grey-scale) implies high capacitive coupling and thus a small sensed distance between the detection surface and the fingerprint topography. A high pixel intensity may result because the corresponding sensing element is located at a ridge of the fingerprint topography. An intermediate pixel intensity may indicate that the sensing element is covered by the finger topology but is located at a valley of the fingerprint topography.

FIG. 2 illustrates a finger 5 engaging a detection area 22 of a detection surface 21 of a fingerprint sensor 3. The detection area 22 may correspond to the area imaged by the image time-sequences produced by the fingerprint sensor, and may constitute all or a part of the detection area 21. The fingerprint sensor 3 may e.g. be configured such that when a condition has been fulfilled which indicates the presence of an object (e.g. a finger) at the detection surface 21, the acquiring of a time-sequence of images is triggered. The condition may e.g. be that a threshold number of sub-regions of the detection surface indicates the presence of the object. When the acquiring of the image time-sequence is triggered, the finger is thus already engaging with the detection surface 21, but is not necessarily yet in contact with the detection surface over the whole detection area 22. The time-sequence of images may thus show the finger during the time when the finger is approaching and being pressed against the detection surface. Alternatively, the time-sequence of images may be acquired over a later time interval during which the finger is engaging the detection surface, including while the finger is leaving the detection surface, e.g. triggered by movement of the finger as it engages the detection surface.

That the acquiring of a time-sequence of images is triggered implies that a first image of the time-sequence is produced and stored by means of the fingerprint sensor, and possibly hardware associated with said fingerprint sensor, at the time of said triggering.

FIG. 3 illustrates an embodiment of the fingerprint analysis system 30. The fingerprint analysis system comprises processing circuitry 31 e.g. a central processing unit (CPU). The processing circuitry 31 may comprise one or a plurality of processing units in the form of microprocessor(s). However, other suitable devices with computing capabilities could be comprised in the processing circuitry 31, e.g. an application specific integrated circuit (ASIC), a field programmable gate array (FPGA) or a complex programmable logic device (CPLD). The processing circuitry 31 is configured to run one or several computer program(s) or software (SW) 35 stored in a storage 34 of one or several storage unit(s) e.g. a memory. The storage unit may be regarded as a computer readable means as discussed herein and may e.g. be in the form of a Random Access Memory (RAM), a Flash memory or other solid state memory, or a hard disk, or be a combination thereof. Additionally, any mobile or external data storage means, such as a disc, memory stick or server may be regarded as such a computer program product. The processing circuitry 31 may also be configured to store data in the storage 34, as needed.

The processing circuitry 31 may, upon running the SW 35, comprise modules for performing operations corresponding to method steps of embodiments of the present disclosure. For instance, the processing circuitry 31 may comprise fingerprint image acquisition circuitry 33, e.g. connected to a fingerprint sensor 3 optionally comprised in the fingerprint analysis system, or to a communication interface for acquiring the image sequences from externally of the fingerprint analysis system, e.g. from a database 36. Further, the processing circuitry 31 may comprise image processing circuitry 32 for processing the acquired image sequences in accordance with embodiments of the present disclosure.

Accordingly (see also FIG. 5), embodiments of the fingerprint analysis system 30 comprises processing circuitry 31, and data storage 34 storing instructions 35 executable by said processing circuitry whereby said fingerprint analysis system is operative to acquire a plurality of time-sequences 50 of images $I_1 \ldots I_n$, each of the time-sequences showing a respective finger 5 as it engages a detection surface 21 of a fingerprint sensor 3, each of the time-sequences comprising at least a first image $I_4$ and a last image $I_n$ showing a fingerprint topography of the finger, wherein the respective fingers of some of the time-sequences are known to be live fingers and the respective fingers of some other of the time-sequences are known to be spoof fingers; and train a machine learning algorithm with the plurality of time-sequences to produce a model of the machine learning algorithm for differentiating between a live finger and a spoof finger.

In some embodiments, the fingerprint analysis system 30 comprises a fingerprint sensor 3, and the plurality of time-sequences 50 are acquired by means of said fingerprint sensor. In this case, the fingerprint analysis system for training the machine learning algorithm may be comprised in an electronic device 1 as discussed herein.

In some other embodiments, the plurality of time-sequences 50 are acquired from a database 36. In this case, the fingerprint analysis system for training the machine learning algorithm may e.g. be comprised in a central server arrangement, separate from any electronic device(s) 1 as discussed herein.

As yet another alternative, the plurality of time-sequences 50 are acquired in real-time from respective electronic devices 1 in association with authentication operations performed thereon. Thus, the machine learning algorithm may be trained in real-time by means of time-sequences 50 from a plurality of electronic devices 1 with which the fingerprint analysis system is in communication, e.g. electronic devices using the model obtained from training the machine learning algorithm, whereby the model may be ever more finely tuned the more it is used. Also in this case, the fingerprint analysis system for training the machine learning algorithm may e.g. be comprised in a central server arrangement, separate from the electronic device(s) 1 as discussed herein.

Referring to the block diagram in FIG. 4, the electronic device 1 in FIG. 1 comprises the display 2 and a fingerprint analysis system 30, as discussed with reference to FIG. 3, comprising a fingerprint sensor 3, as well as the fingerprint image acquisition circuitry 33, the image processing circuitry 32 and the data storage 34, e.g. in the form of a memory, which may be shared between different components of the electronic device.

Thus, the electronic device of embodiments of the present invention comprises a fingerprint sensor 3, processing circuitry 31, and data storage 34 storing instructions 35 executable by said processing circuitry whereby said electronic device is operative to acquire a time-sequence 50 of images $I_1 \ldots I_n$ of a finger 5 as it engages a detection surface 21 of the fingerprint sensor, wherein the time-sequence comprises at least a first image h and a last image $I_n$ showing a fingerprint topography of the finger. The electronic device is also operative to apply a model of a machine learning algorithm to the time-sequence. The electronic device is also operative to, based on a result of the applied model, determine whether the finger is a live finger or a spoof finger.

Typically, the machine learning model, is the model resulting from the training of the machine learning algorithm in a fingerprint analysis system 30 as discussed herein. The model may e.g. be preprogrammed in the electronic device, typically after having been prepared in a fingerprint analysis system 30 in an external server arrangement. Alternatively, the model may be the result of training of the machine learning algorithm locally in the fingerprint analysis system 30 comprised in the electronic device 1.

The electronic device 1 may also comprise a device control unit 41 configured to control the electronic device 1 and to interact with the fingerprint analysis system 30. The electronic device may also comprise a battery (not shown) for providing electrical energy to the various components of the electronic device 1. Although not shown in FIG. 4, the electronic device may comprise further components depending on application. For instance, the electronic device 1 may comprise circuitry for wireless communication, circuitry for voice communication, a keyboard etc.

The electronic device 1 may be any electrical device or user equipment (UE), mobile or stationary, e.g. enabled to communicate over a radio channel in a communication network, for instance but not limited to e.g. mobile phone, tablet computer, laptop computer or desktop computer.

The electronic device 1 may thus comprise an embodiment of the fingerprint analysis system 30 discussed herein, and a device control unit 41 configured to interact with the fingerprint analysis system.

In some embodiments, the fingerprint sensor 3 is a capacitive, ultrasonic or optical fingerprint sensor, e.g. a capacitive fingerprint sensor.

In some embodiments, the fingerprint sensor 3 is covered by a glass layer, e.g. by means of a cover glass or a glass coating, e.g. protecting the sensing elements and providing the detection surface 21 of the fingerprint sensor.

In some embodiments, the device control unit 41 is configured to interact with the fingerprint analysis system 30 such that the determining that a finger 5 is a live finger by the fingerprint analysis system is detected as a command for granting access to functionality (e.g. data) of the electronic device 1 based on said determining by the device control unit, typically in combination with an authentication operation. Thus, a human user of the electronic device may e.g. open up the electronic device or otherwise verify his/her identity with the electronic device by the electronic device determining that the finger engaging the detection surface 21 is live and authenticating that it belongs to the correct user of the electronic device. Authentication may be performed, independently of the liveness determining S13, before or after, or concurrently with, said liveness detecting.

Figure 5:
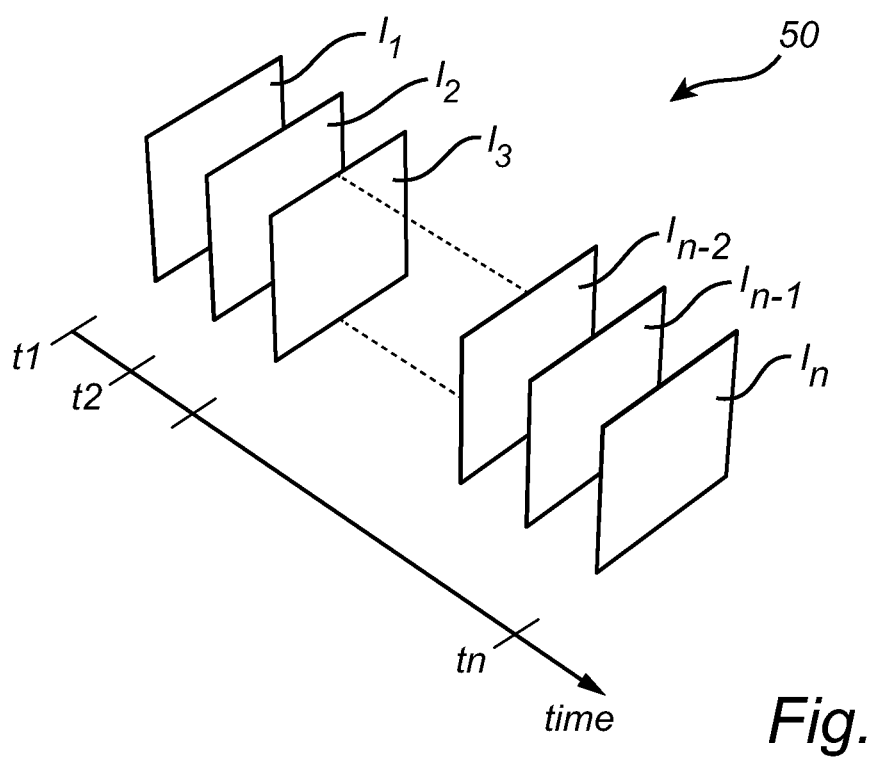
FIG. 5 schematically illustrates a time-sequence of images, in accordance with an embodiment of the present disclosure.

As a finger 5 engages the detection surface 21 of the fingerprint sensor 3, the fingerprint sensor is activated to by means of the fingerprint image acquisition circuitry 33 acquire a time-sequence 50 of images $I_1$ to $I_n$ (herein also denoted $I_1 \ldots I_n$) as illustrated in FIG. 5. Such a time-sequence 50 may comprise at least a first image $I_4$, taken at a first time point t1, and a last image $I_n$, taken at a last time point $t_n$ which is in time domain after the first time point t1. The time-sequence may comprise any number of images I, in addition to the first and the last images. For example, the time-sequence comprises at least 3, at least 5 or at least 10 images I, e.g. obtained at a rate of at least 20 images per seconds, or at least 50 images per second. The time-sequence 50 does not necessarily contain all images obtained as the finger engages the detection surface, but may consist of a sub-group of the obtained images, typically in sequence.

Typical spoof fingers (especially those made from latent prints) are often very flat compared to live fingers, and made from a material which is less formable than a live fingertip. This flatness gives rise to a difference in image sequences 50 captured while the finger/spoof is e.g. approaching the detection surface 21. Typically, the soft and rounded fingertips of live fingers easily fill out the detection area 22 almost instantly, while the spoofs wiggle and take more time to exert even pressure over the whole detection area. This is illustrated by the two image time-sequences 50 of FIGS. 6a and 6b, respectively.

Figure 6:
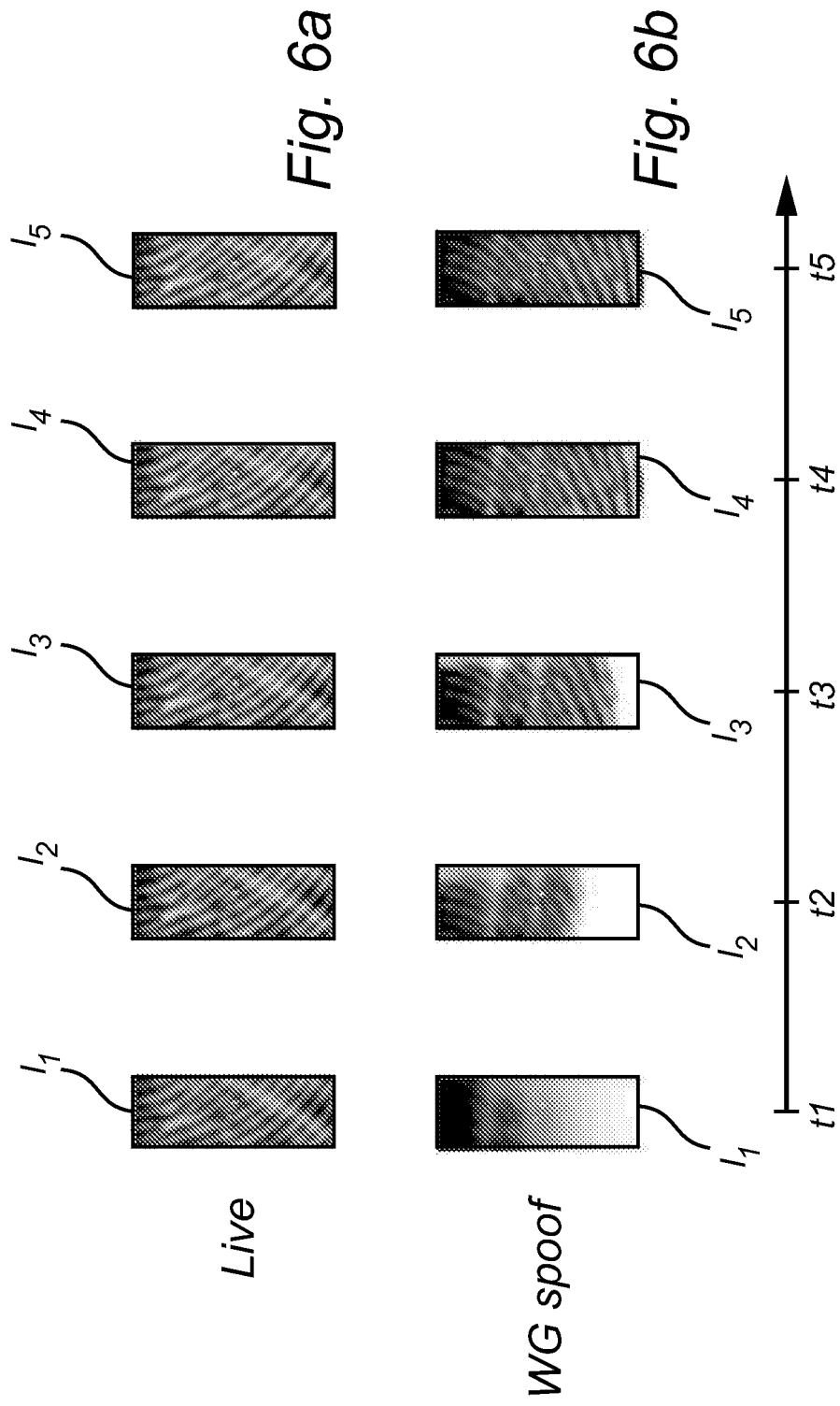
FIG. 6a shows a time-sequence of grey-scale images of a live finger, in accordance with an embodiment of the present disclosure.
FIG. 6b shows a time-sequence of grey-scale images of a wood glue (WG) spoof finger, in accordance with an embodiment of the present disclosure.

FIG. 6a shows an image sequence 50, comprising five images $I_1$ to $I_5$ in time-sequence, of a live finger 5 as it is being placed onto the detection surface 21. As can be seen, the finger almost instantly fills out the whole detection area 22 (corresponding to the area of the images I) and exerts uniform pressure over the whole detection area.

FIG. 6b, in contrast, shows an image sequence 50, comprising five images $I_1$ to $I_5$ in time-sequence, of a spoof finger as it is being placed onto the detection surface 21. As can be seen, due to wiggling as a result of the less formable material, it takes longer time before the spoof finger covers and exerts uniform pressure over the whole detection area 22, in this case at time t5 of the fifth image $I_5$.

In the obtained grey-scale images I, the ridges of the fingerprint topography of the live or spoof finger appear as black or dark grey, indicating direct contact with the detection surface 21. The valleys of the fingerprint topography are in contrast lighter grey in colour, still covering the detection area 22 but not being in direct contact with the detection surface 21. The larger white areas indicate that the (spoof) finger is not (yet) covering that part of the detection area 22.

This difference in behaviour between live and spoof fingers shown in FIGS. 6a and 6b is something which, in accordance with the present disclosure, machine learning is used for defining and differentiating between live and spoof fingers.

Figure 7:
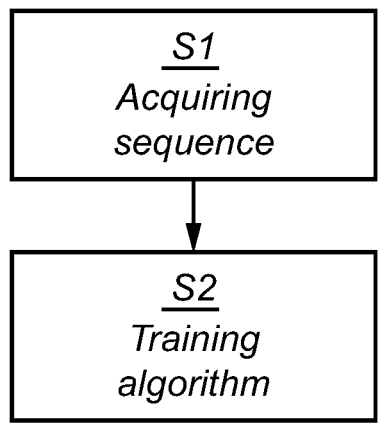
FIG. 7 is a schematic flow chart of an embodiment of the present disclosure performed in a fingerprint analysis system.

FIG. 7 is a flow chart illustrating an embodiment of the method for training the machine learning algorithm performed in a fingerprint analysis system 30, for facilitating differentiating between a live finger and a spoof finger. The method comprises acquiring, S1, a plurality of time-sequences 50 of images $I_1 \ldots I_n$. Each of the time-sequences shows a respective finger 5 as it engages a detection surface 21 of a fingerprint sensor 3. Each of the time-sequences comprises at least a first image $I_1$ and a last image $I_n$ showing a fingerprint topography of the finger 5. The respective fingers of some of the time-sequences 50 are known to be live fingers and the respective fingers of some other of the time-sequences are known to be spoof fingers. The method also comprises training, S2, a machine learning algorithm on the plurality of time-sequences 50 to produce a model of the machine learning algorithm for differentiating between a live finger and a spoof finger.

Figure 8:
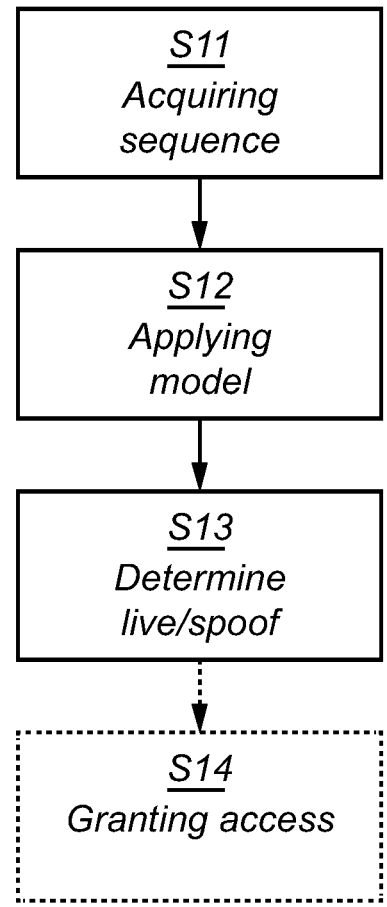
FIG. 8 is a schematic flow chart of an embodiment of the present disclosure performed in an electronic device.

FIG. 8 is a flow chart illustrating an embodiment of the method for using the machine learning model in an electronic device 1. The electronic device comprises a fingerprint sensor 3 of a device internal fingerprint analysis system 30 for differentiating between a live finger and a spoof finger, typically in association with an authentication operation performed by the electronic device by means of the fingerprint sensor. The method comprises acquiring, S11, a time-sequence 50 of images $I_1 \ldots I_n$ of a finger 5 as it engages a detection surface 21 of the fingerprint sensor. The time-sequence comprises at least a first image $I_1$ and a last image $I_n$ of the time-sequence showing a fingerprint topography of the finger. The method also comprises applying, S12, a model of a machine learning algorithm to the time-sequence. The method also comprises, based on a result of the applied model, determining, S13, whether the finger 5 is a live finger or a spoof finger, i.e. the finger is classified as a live or spoof finger. The method thus relates to performing a classification of the finger of the time-sequence using a model obtained through machine learning.

The machine learning algorithm may be any suitable machine learning algorithm, e.g. a Support Vector Machine (SVM) algorithm, or a neural networks algorithm such as a deep learning algorithm or Multi-Layer Perception (MLP) algorithm. Herein, an SVM algorithm, which is preferred in some embodiments, is used as an example. The machine learning algorithm may be applied to or use features extracted from the images I. These features may e.g. be raw intensity values (e.g. grey-scale values) or some processed representation of the intensity values. For instance, the intensity values, or representations thereof, may be arranged in a one-dimensional (1D) vector and run through Principal Component Analysis (PCA) for reduction of dimensionality.

Below follow two examples of feature extraction and machine learning algorithms, which may be used both when training, S2, the algorithm and when applying, S12, a model of the machine learning algorithm, including image analysis. The examples use SVM, but any other type of machine learning, e.g. as exemplified above may be used instead. Herein, the examples are called Subspace Kernel Classifier (SKC) and Edge Stability Classifier (ESC), respectively.

Subspace Kernel Classifier (SKC)

A general idea of the SKC is to accumulate raw pixel information from an image sequence 50, project the information into a lower-dimensional subspace and apply machine learning techniques to classify samples as live or spoof.

With reference to FIG. 9, the machine learning algorithm comprises, for each time-sequence 50, forming, S21, a one-dimensional vector (called image vector herein) of pixel information from the time-sequence 50 of images $I_1 \ldots I_n$. This 1D vector may then be more easily analysed than the raw 2D pixel data. The 1D image vector may then be normalized, S22, e.g. by scaling each of the features (vector elements) to the interval [−1, 1]. Scaling factors may be obtained from the training of the algorithm. Other normalization schemes are possible, such as normalization to zero mean and unit variance.

Then, PCA may be applied, S23, to the 1D image vector to reduce the dimensionality thereof, after which SVM:s may be applied, S24, to the 1D image vector with reduced dimensionality. Usually, a normalisation step, S22, is applied before the PCA step, but not necessarily. The PCA model may be obtained from the training of the algorithm in a similar way as the machine learning model, whereby it learns how to reduce the data based on statistics. Between PCA and applying SVM, a feature selection algorithm may be applied, to further reduce the dimensionality but in this case to focus the training or classification on the most relevant features with respect to discrimination.

A more specific algorithm for classification (applying, S12, the model) may e.g. be as set out below.
1. Input: A sequence 50 of images I (fixed-length sequences). If shorter than the required length, the sequence will be extended by copying the last image $I_n$, subspace model, normalization parameters and machine learning model.
2. Step 1: A 1D vector is formed, S21, by converting each of the 2D images I in the sequence into 1D vectors and concatenating the vectors over the sequence.
3. Step 2: The vector is normalized, S22, by scaling each of the features (vector elements) to the interval [−1, 1].
4. Step 3: Principal Component Analysis (PCA) is applied, S23, to the sequence to de-correlate the pixel data and thereby reduce the dimensionality.
5. Step 4: Support Vector Machines (SVMs) are applied, S24, to the low-dimensional vector output from the previous step to decide whether the input sample represents a live sample or a fake/spoof sample.
6. Output: A probability of the sample being live (a determination/classification, S13, is then obtained by thresholding on the probability).

In case of training, S2, it is already known whether the samples are live or spoof, and the output includes generated normalization coefficients, the PCA model and the SVM model.

Edge Stability Classifier (ESC)

The basic principle of ESC is based on the observation that that image edges are stable in time sequences 50 of live samples (see e.g. the sequence of FIG. 6a), while substantial instability occurs in case of spoof (see e.g. the sequence of FIG. 6b), where edges can appear, disappear, and/or shift throughout the sequence. Edges herein are typically the borders between ridges and valleys as they appear in the images I, or between parts of the detection area 22 covered and not covered by the finger 5, e.g. edges between light and dark (white and black) as represented by intensity values. For example, the well-known Canny edge detector algorithm may be used to obtain the edge images.

With reference to FIG. 10, the machine learning algorithm may comprise, for each image I of each time-sequence 50, detecting, S31, edges of the image to form an edge image, e.g. by means of a Canny edge detector algorithm. Then, the machine learning algorithm may comprise superpositioning, S32, the edge images of the time-sequence 50 to form an accumulated edge image per time-sequence. Histograms representing the accumulated edge image may then be extracted, S33. The histogram information may be arranged, S34, in a 1D vector for further analysis. Also, in some embodiments, the histogram vector is normalized, similarly as discussed above in relation to SKC. SVM:s may be applied, S35, to the vector of said histograms.

A more specific algorithm for classification (applying, S12, the model) may e.g. be as set out below.
1. Pixel intensity gradients are extracted from each image I of the sequence 50.
2. Edges are extracted, S31, from each image of the sequence.
3. Edges are accumulated, S32, throughout the sequence (e.g. simply by adding edge images to each other). If the sequence is shorter than expected, the last image $I_n$ is repeated to compensate for the missing images.
4. The contents of the resulting accumulated edges are summarized, S33, into a histogram showing the frequencies of the edge points appearing repeatedly in the sequence. Sequences with stable edges tend to have histograms peaks in the higher-valued bins (rightmost), while unstable edge sequences tend to be condensed in the lower-valued bins (leftmost).
5. Much richer information can be gained by quantizing the Gradient images into a certain number of levels and repeating the accumulation and histogramming steps on the quantized gradient images.
6. Even further detailed representation can be achieved by dividing the accumulated image into sub-regions and extracting a separate histogram from each sub-region.

7. The final feature vector, S34, is the concatenation of the resulting histograms.
8. A machine learning paradigm (e.g. SVM or MLP), S35, is then used to classify, S13, the resulting feature vector into belonging to a live sample or spoof one.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a fingerprint analysis system for liveness detection, the method comprising:
   acquiring a plurality of time-sequences of images, each of the time-sequences showing a respective finger as the respective finger engages a detection surface of a fingerprint sensor during a time period when the respective finger is approaching and being pressed against the detection surface until the finger covers a whole detection area of the detection surface, the detection area corresponding to an area imaged in the time-sequences, each of the time-sequences comprising at least a first image and a last image showing a fingerprint topography of the respective finger, wherein the respective fingers of a first set of the time-sequences are known to be live fingers and the respective fingers of a second set of the time-sequences are known to be spoof fingers; and
   training a machine learning algorithm on the plurality of time-sequences to produce a model of the machine learning algorithm for differentiating between a live finger and a spoof finger,
   wherein, for each of the time-sequences, acquiring of the time-sequence has been triggered when the detection surface indicates a presence of the respective finger but the respective finger is not yet in contact with the detection surface over the whole detection area of said detection surface.

2. The method of claim 1, wherein the fingerprint analysis system comprises the fingerprint sensor, and wherein the plurality of time-sequences are acquired by means of said fingerprint sensor.

3. The method of claim 1, wherein the plurality of time-sequences are acquired from a database.

4. The method of claim 1, wherein the plurality of time-sequences are acquired in real-time from respective electronic devices in association with authentication operations performed thereon.

5. The method of claim 1, wherein each of the time-sequences has been obtained at a rate of at least 20 images per second.

6. The method claim 1, wherein the machine learning algorithm is a Support Vector Machine (SVM) algorithm, a neural networks algorithm, a deep learning algorithm, or Multi-Layer Perception (MLP) algorithm.

7. The method claim 1, wherein the machine learning algorithm comprises, for each time-sequence, forming a one-dimensional vector of pixel information from the time-sequence of images.

8. The method of claim 7, wherein Principal Component Analysis (PCA) is applied to the one-dimensional vector to reduce the dimensionality thereof.

9. The method of claim 8, wherein one or more Support Vector Machines are applied to the one-dimensional vector with reduced dimensionality.

10. The method of claim 1, wherein the machine learning algorithm comprises, for each image of each time-sequence, detecting edges of the image to form an edge image.

11. The method of claim 10, wherein the machine learning algorithm further comprises superpositioning the edge images of the time-sequences to form an accumulated edge image per time-sequence.

12. The method of claim 10, wherein the machine learning algorithm further comprises extracting histograms representing the accumulated edge image.

13. The method of claim 12, wherein one or more Support Vector Machines are applied to a vector of said histograms.

14. A computer program product comprising a non-transitory computer readable medium storing computer-executable components for causing a fingerprint analysis system to perform the method of claim 1 when the computer-executable components are run on processing circuitry comprised in the fingerprint analysis system.

15. A method performed in an electronic device comprising a fingerprint sensor of a fingerprint analysis system in association with an authentication operation performed by the electronic device and the fingerprint sensor, the method comprising:
   acquiring a time-sequence of images of a candidate finger as the candidate finger engages a detection surface of the fingerprint sensor during a time period when the candidate finger is approaching and being pressed against the detection surface until the candidate finger covers a whole detection area of the detection surface, the detection area corresponding to an area imaged in the time-sequence, wherein the time-sequence comprises at least a first image and a last image of the time-sequence showing a fingerprint topography of the candidate finger,
   applying a model of a machine learning algorithm to the time-sequence; and
   based on a result of the applied model, determining whether the candidate finger is a live finger or a spoof finger,
   wherein the acquiring is triggered when the detection surface indicates a presence of the candidate finger but the candidate finger is not yet in contact with the detection surface over the whole detection area of said detection surface.

16. The method of claim 15, wherein the determining comprises determining that the candidate finger is a live finger, whereby the method further comprises:
   granting access to functionality of the device based on said determining.

17. The method of claim 15, wherein the model is preprogrammed in the electronic device.

18. The method of claim 15, wherein the time-sequence is obtained at a rate of at least 20 images per second.

19. A fingerprint analysis system comprising:
   processing circuitry; and
   data storage storing instructions executable by said processing circuitry whereby said fingerprint analysis system is operative to:
      acquire a plurality of time-sequences of images, each of the time-sequences showing a respective finger as the respective finger engages a detection surface of a fingerprint sensor during a time period when the respective finger is approaching and being pressed against the detection surface until the finger covers a whole detection area of the detection surface, the detection area corresponding to an area imaged in the time-sequences, each of the time-sequences comprising at least a first image and a last image showing a fingerprint topography of the respective finger, wherein the respective fingers of a first set of the time-sequences are known to be live fingers and the respective fingers of a second set of the time-sequences are known to be spoof fingers; and train a machine learning algorithm with the plurality of time-sequences to produce a model of the machine learning algorithm for differentiating between a live finger and a spoof finger, wherein, for each of the time-sequences, acquiring of the time-sequence has been triggered when the detection surface indicates a presence of the respective finger but the respective finger is not yet in contact with the detection surface over the whole detection area of said detection surface.

20. The fingerprint analysis system of claim 19, further comprising the fingerprint sensor.

21. An electronic device comprising:
a fingerprint sensor;
processing circuitry; and
data storage storing instructions executable by said processing circuitry whereby said electronic device is operative to:

acquire a time-sequence of images of a candidate finger as it engages a detection surface of the fingerprint sensor during a time period when the candidate finger is approaching and being pressed against the detection surface until the candidate finger covers a whole detection area of the detection surface, the detection area corresponding to an area imaged in the time-sequence, wherein the time-sequence comprises at least a first image and a last image showing a fingerprint topography of the candidate finger;

apply a model of a machine learning algorithm to the time-sequence; and based on a result of the applied model, determine whether the candidate finger is a live finger or a spoof finger, wherein the acquiring is triggered when the detection surface indicates a presence of the candidate finger but the candidate finger is not yet in contact with the detection surface over the whole detection area of said detection surface.

* * * * *